United States Patent [19]
Galasso

[11] 3,874,335
[45] Apr. 1, 1975

[54] EXPERIMENTAL STUDY STATION

[76] Inventor: Vincent G. Galasso, 3676 Edgehill Rd., Yorktown Heights, N.Y. 10598

[22] Filed: Jan. 11, 1974

[21] Appl. No.: 432,697

[52] U.S. Cl. .................................... 119/1, 119/15
[51] Int. Cl. ............................................ A01k 1/00
[58] Field of Search ........................... 119/1, 15, 17

[56] References Cited
UNITED STATES PATENTS

| | | | |
|---|---|---|---|
| 2,539,633 | 1/1951 | Morrill | 119/1 |
| 3,626,902 | 12/1971 | Orfei | 119/15 |
| 3,687,110 | 8/1972 | Braunhut | 119/1 |
| 3,789,799 | 2/1974 | Orfei | 119/15 |

Primary Examiner—Hugh R. Chamblee
Attorney, Agent, or Firm—Lewis H. Eslinger; Alvin Sinderbrand

[57] ABSTRACT

An experimental study station adapted for use in conducting environmental and genetic studies or the like on various life forms, such as insects, includes a frame on which an enclosed tank is mounted. The tank has a removable closure member and a plurality of openings formed in its bottom wall below which individual vials containing experimental material to be supplied to insects in the tank may be positioned. The opened end of the vials are placed against the bottom wall of the tank adjacent their associated tank openings to prevent escape of insects through the bottom openings and they are held in a fixed position with respect to the openings in the bottom wall by a pair of cooperative templates and a spring baised bail.

18 Claims, 5 Drawing Figures

EXPERIMENTAL STUDY STATION

The present invention relates to experimental study or observation stations and, more particularly, to an experimental station in which enviromental and genetic effects may be studied with respect to various life forms and proncipally to insects.

The experimental study station of the present invention is constructed to permit a student or observer to conduct experiments on various forms, principally various types of insects, in order to study various factors which may affect the insects. For example, the station of the present invention permits an observer to treat insects with varying environmental conditions such as atmosphere, temperature, light, food, food additives, chemicals and the like in order to determine what effect such variables have on the insects and their progeny. The station also permits an observer to study various genetic effects on the insects, such as effects derived from inbreeding of the insects, as well as mutation rates in the progeny of insects over an extended period of time. As will be apparent, various other factors relating to heredity and genetics, can also be studied, such as for example, the Hardy-Weinberg law and Mendelian inheritance. Although the experimental station of the present invention can be used to study these various factors on any number of different types of insects, the principal insect used in such studies is the common fruit fly since the life span of that insect is relatively short, usually between 20 to 40 days, so that several generations of the species can be studied within a relatively short period of time.

It is an object of the present invention to provide a study station which is relatively simple in construction, yet which permits the introduction of numerous variables into the life cycle of insects studied in the station.

Yet another object of the present invention is to provide a study station of durable construction which is suitable for use in schools, classrooms and the like.

Yet another object of the present invention is to provide an insect study station which, while simple in construction, prevents escape of insects from the station or admission into the station of undesirable factors.

The above, and other objects, features and advantages of the present invention will be apparent in the following detailed description of an illustrative embodiment thereof which is to be read in connection with the accompanying drawings wherein.

Figure 1:
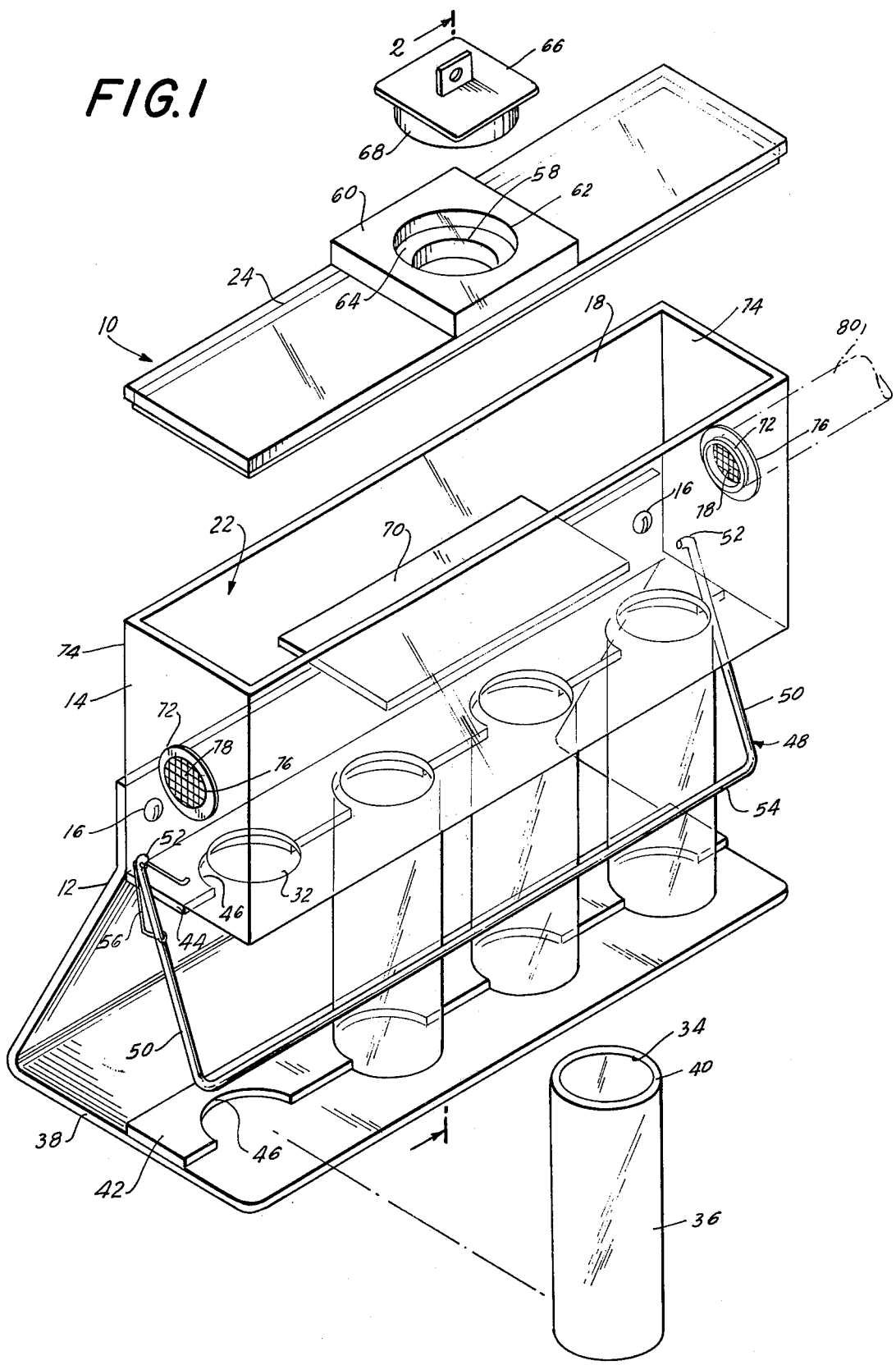
FIG. 1 is a partially exploded view of an experimental study station constructed in accordance with one embodiment of the present invention.

Referring now to the drawings in detail and initially to FIG. 1, it will be seen that the experimental insect study station 10 of the present invention includes a generally L shaped supporting frame 12 on which a housing or tank 14 is mounted. The study station is constructed to permit observation of the effects of various factors relating to growth, development, reproduction and heredity in insects held in the tank.

Preferably tank 14 is formed of any convenient clear material, such as glass, plastic, or Plexiglass panels. The tank can be formed in any convenient manner for such materials, but where Plexiglass panels are used, satisfactory tanks have been formed by simply using an adhesive to secure individual panels of the material together to form the tank.

Tank 14 can be mounted on frame 12 in any convenient manner and, in the illustrative embodiment of the invention, it is seen that a pair of screws 16 extending through the rear wall 18 of tank 14 are used to mount the tank of the frame. In this connection it is noted that the tank can be removably mounted on frame 12, by providing bolts 18 with wing nuts 20 or the like so that the tank can be conveniently removed for cleaning.

Figure 2:
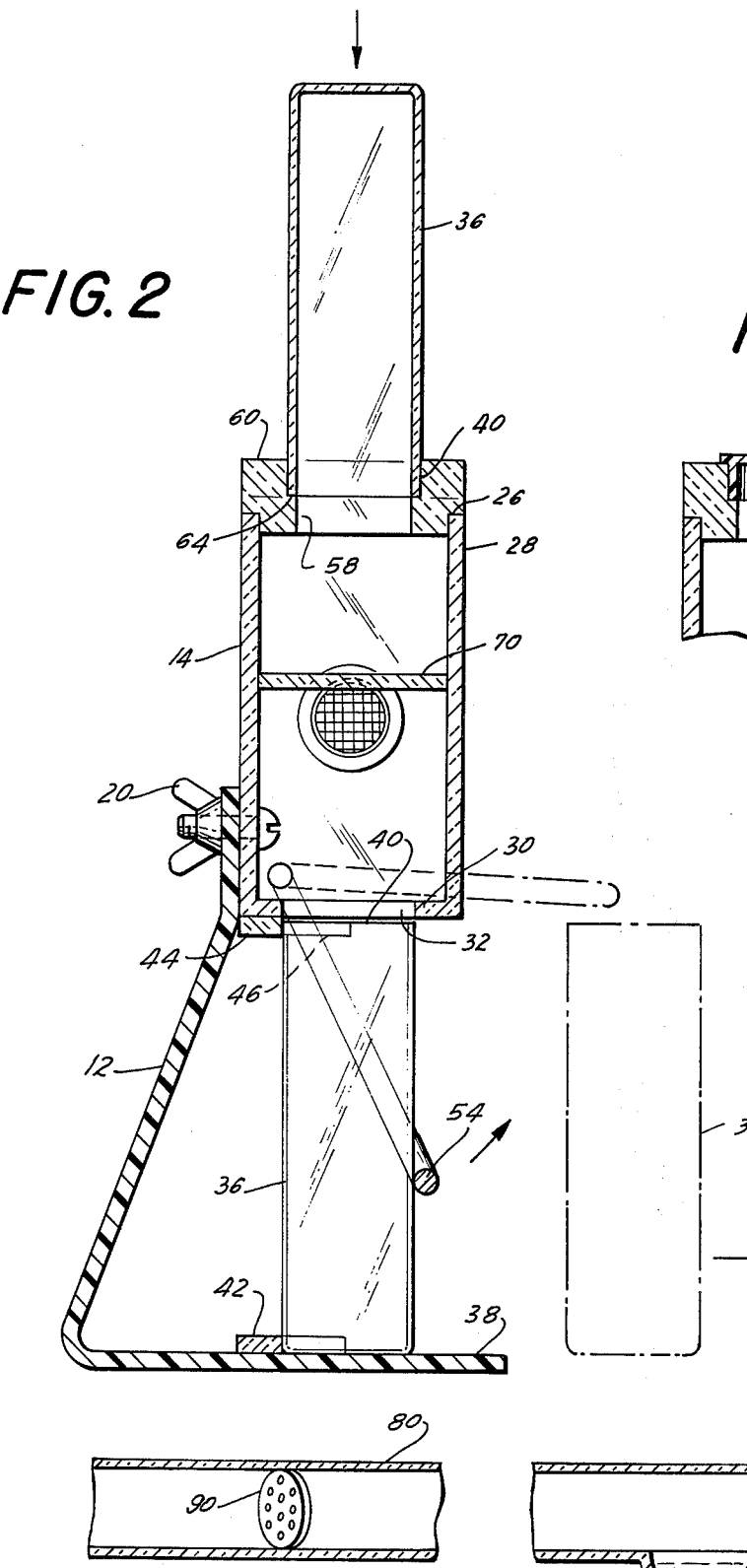
FIG. 2 is a sectional view taken along line 2—2 of FIG. 1, but showing a vial mounted in the top of the study station.
Figure 3:
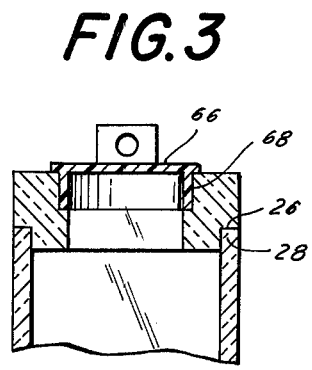
FIG. 3 is a partial sectional view, similar to FIG. 2, showing a plug in the top of the study station in lieu of the vial.

Tank 14 has an open top 22 which is selectively closed by a closure element or plate 24, which is also formed of a transparent material. In the illustrative embodiment of the present invention it is seen that plate 24 is a one piece member having an internal shoulder 26 formed therein, as seen in FIGS. 2 and 3, so as to seat on the top edge 28 of tank 14 about the periphery of opening 22. In this manner the top of the tank is effectively sealed against the escape of insects from the interior thereof. On the other hand, when it is desired to clean the interior of the tank or otherwise obtain access thereto, top 24 is readily removable.

The bottom wall 30 of tank 14 has a plurality of openings 32 formed therein. Preferably, these openings are generally circular in configuration and conform to the open end 34 of individual vials or culture tubes 36. The latter are adapted to contain food, food additives, chemicals or other experimental material which are used in experiments to study their effects on the insects in the tank. Vials 36 are positioned below the individual openings 32, as seen in FIG. 1, and have a height which is substantially equal to the distance between the base leg 38 of the L-shaped frame member and the exterior surface of bottom wall 30. In this manner, when vials 36 are placed beneath openings 32, their upper edge portions 40 engage the bottom wall 30 of the tank to form an effective seal which prevents escape of insects from tank 14.

In order to ensure proper positioning of vials 36, and to maintain the positions thereof during use of experimental station 10, a pair of templates 42, 44 are mounted in the study station. These templates are of substantially identical construction, with the template 42 being secured in any convenient manner, as for example by an adhesive, to the base leg 38 of frame 12 and template 44 being secured by an adhesive or the like to the exterior surface of bottom wall 30. Each of the templates has a plurality of recesses 46 formed therein which conforms generally a portion of the periphery of the vials 36. Thus, in the illustrative embodiment of the invention wherein vials 36 have a cylindrical configuration, recesses 46 are semi-circular in plan.

With this construction, vials 36 can be placed beneath tank 14 and against the peripheral curved walls of the recesses 46. Accordingly, the vials are supported against movement at two positions, by the respective templates, so that they are held in a relatively fixed position with respect to their associated openings 32 in bottom wall 30.

In order to further ensure against movement vials 36 during use of the study station, a spring biased bail member 48 having a generally U-shaped configuration is provided. Bail 48 has a pair of parallely extending legs 50 which are pivotally mounted in tank 14 in any convenient manner, such as by inserting the bent ends 52 thereof in apertures formed in the side walls of the tank. By this arrangement, the bight portion 54 of the bial extends across vials 36, parallel to the template 42, 44. Thus, because of the pivotal mounting of bails 48, it can be raised (as shown for example in dotted lines in FIG. 2) to permit vials 36 to be inserted or removed from their respective positions in the recesses of the templates. When the vials are in position, the bail is released so that it moves to its solid line position in FIG. 2 wherein it biases the vials against the wall of recesses 46.

In order to prevent inadvertent movement of the bail during use of the study station, a spring member 56, mounted between tank 10 and one of the legs 50 of the bail can be used to bias the bail towards the upright leg of frame 12, i.e., towards the recesses 46 in templates 42, 44 in order to apply a positive force to the vails, holding them in position against the templates.

In order to facilitate the insertion of insects into the 14, top plate 24 has an opening 58 formed therein which corresponds substantially to the opening 34 in the top of a vial 36. In addition, a support block 60 is mounted on the exterior surface of top 24 and has an opening 62 formed therein which is of substantially the same diameter as the outside diameter of a vial 36. In this manner a shoulder 64 is formed by top 24 about the periphery of opening 58. When the study station is in use, opening 58 is normally closed by a plug 66 which is preferably formed of a plastic material, having a cylindrical stop 68 which is frictionally held opening 62 of support plate 60. However, when it is desired to insert insects from a supply vial 36 into tank 10, plug 66 is removed and a vial 36 is placed in opening 62. Since the diameter of opening 62 is substantially equal to the outer diameter of the vial 36, a substantial seal is formed about the periphery of the upper and portion 40 of the vial so that insects cannot escape through the opening while the vial is supported on the shoulder 64. On the other hand, opening 58 remains entirely free so that insects from vial 36 can fall therethrough into tank 14.

Often, insects are anesthetized before they are placed in the study station. Thus, in order to prevent anesthetized insects from falling into the vials 36, an insect support plate 70 is mounted in tank 14 beneath opening 58. The plate may be formed of the same material as tank 14 and can be secured thereto in any conventional manner, as for example by an adhesive. By this instruction the anesthetized insects fall from the vial 36 into plate 70 and are supported thereon.

In order to provide ventilation for insects in tank 14, a pair of apertures 72 are formed in the side walls 74 of the tank. These apertures are closed by foraminous plugs 76 which preferably consist of metal rings adapted to frictionally fit in the apertures 72 and which have foraminous screens 78 mounted therein. Screens 78, of course, permit air to flow into and out of tank 14, while preventing insects from escaping through openings 72. In addition, since the plugs 76 are removable, apertures 72 are available for use in certain experimental procedures. Thus, for example, where it is desired to cross-mate insects or species raised in separate or segregated study stations, the two stations are conveniently interconnected by removing one plug 76 from each of the stations and interconnecting the stations by means of a tube 80 frictionally engaged and mounted in an aperture 72. This provides communication between the two stations, so that the insects can freely move from on station to another to mate.

Figures 4, 5:
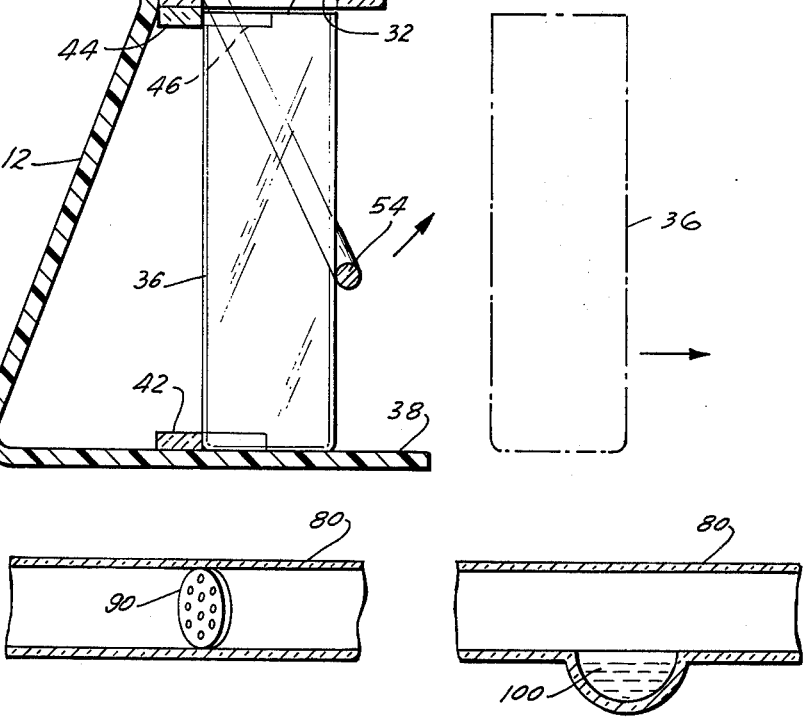
FIG. 4 is a partial sectional perspective view of a portion of a station connecting tube for use with the study station of the present invention.
FIG. 5 is a view similar to FIG. 4 of another station connecting tube.

Migratory tubes or bridges 80 also can be modified to provide barriers to the movement of one group of insects from one study station while allowing relatively free movement for the insects of a second study station to which tube 80 is connected into the first station. For example, tube 80 can be provided with perforated disk 90 (FIG. 4) or a water filled well 100 (FIG. 5) which will permit flying insects to pass from one station to another but which will prevent or at least seriously hinder other insects, e.g., of the non-flying variety from passing from one station to another.

The experimental study station of the present invention is adapted to permit an experimentor or a student to subject an insect colony or species of insect to various conditions and then to determine the effects of such conditions on the insects and their progeny. In addition, the station enables the experimentor to study the effects of inbreeding, mutations, competition and hybridization of a species.

As mentioned, although numerous types of insects can be studied with the station of the present invention, the fruit fly or Drosophilia Melanogaster is the preferred insect for such studies, since they have a relatively short life expectancy and rapid reproduction cycle. This enables the experimentor to study the effect of his experiments over numerous generations of the species, within a relatively short period of time.

By providing the experimental station with a plurality of vials that can be associated with the tank 14, the experimentor can subject the insects being studied to various conditions. For example, the experimentor can study the effects of one chemical or food additive or the like simply by placing the additive in one of the vials 36 while the other vials remain empty. On the other hand, where the effects of more than one substance, or a combination or substances are to be studied, the different substances can be placed in respective vials in the respective proportions which are to be studied. Thus, the experimenter has the ability to subject the insects being tested to a large number of possible combinations of environments with the station of the present invention. Moreover, as mentioned, the station permits selective intermixing to be connected through the ventilation openings 72 formed in its side wall with the aid of connecting hoses 80 or the like.

Still further, the station can permit the insects to be subjected to various atmopheric conditions by simply placing a non-foraminous plug in one of the holes 72 while supplying the selected atmosphere from a source thereof through the other hole 72 via a tube 80.

Accordingly, it will be appreciated that the study station of the present invention will permit the convenient study of Medelian inheritance, the Hardy-Weinberg Law, the determination of mutation rates, and species competition any hybridization. In addition, factors effecting gene frequency, such as genotypes, lethal genes, multiple alleles, linkage, crossing over, translocation, genetic drift and other factors such as environmental conditions, temperature, light, color, food additives and other chemicals can be studied. Moreover, the ability of the present invention to permit such advantageous studies, is achieved by the construction which is relatively simple and yet durable in construction.

Although an illustrative embodiment of the present invention has been described herein with reference to the accompanying drawings, it is to be understood that the invention is not limited to that precise embodiment, and that various changes and modifications can be effected therein by one skilled in the art without departing from the scope or spirit of this invention.

What is claimed is:

1. An experimental study station comprising an enclosed tank having at least one opening therein and adapted to hold a life form for study; at least one vial having an open end positioned adjacent the opening in said tank for containing an experimental material to be supplied to said life form, and means for removably holding said vial in a fixed position with respect to said opening; said tank having a second opening formed therein, and closure means for selectively opening and closing said second opening to permit cleaning of said tank and insertion and removal of life forms therefrom; and a frame having upper and lower end portions; said tank having a bottom wall with said one opening formed therein and being mounted on the upper end portion of said frame and said vial being positioned in said frame below said tank.

2. The study station as defined in claim 1 wherein said tank includes a third opening therein and a foraminous element mounted in said third opening to permit ventilation of said tank while preventing escape of said life forms therefrom.

3. The study station as defined in claim 1 including at least one template having a recess formed therein conforming to and receiving at least a portion of the periphery of said vial, said template being positioned to locate said vial with respect to said one opening.

4. The study station as defined in claim 3 wherein said means for holding said vial includes a pivotally mounted bar positioned to engage said vial on the side thereof opposite said recess and spring means for biasing said bar towards said vial to hold the vial in said recess.

5. The study station as defined in claim 1 including a plate mounted in said tank for supporting said life form in a position remote from said one opening.

6. An experimental study station for use in conducting environmental and genetic studies and the like on insects which comprises a frame having upper and lower end portions, and a tank adapted to contain a plurality of insects therein and being mounted on said upper end portion of said frame; said tank having an open top and a bottom wall opposite said open top, said bottom wall having a plurality of apertures formed therein, and closure means for selectively opening and closing said top; a plurality of vials having open end portions conforming substantially in configuration to the openings in the bottom walls of said tank and adapted to be positioned below said tank with the open end portion of each vial below an associated opening in said bottom wall, said vials being adapted to contain experimental material to be supplied to said insects; and means for removably holding said vials in a fixed position below and with respect to their associated openings.

7. The study station as defined in claim 6 wherein said closure means comprises a removable top member for closing the open top of said tank, said top member having an access opening formed therein for permitting access to the interior of said tank without removing said top, and removable plug means for selectively opening and closing said access opening.

8. The study station as defined in claim 7 wherein said access opening has a configuration conforming substantially to that of one of said vials and said top has a flange formed therein about the periphery of said access opening to support a vial in said opening whereby the open end of a vial may be inserted in said opening and supported there by said flange to allow insects in the vial to enter the tank.

9. The study station as defined in claim 8 including a support platform mounted in said tank below said access opening and above the openings in the bottom wall of the tank to support insects inserted in said tank above said openings in the bottom wall.

10. The study station as defined in claim 6 wherein said tank and closure are formed of a transparent material.

11. The study station as defined in claim 6 including ventilation apertures formed in said tank.

12. The study station as defined in claim 11 including foraminous plugs removably mounted in said ventilation apertures to permit ventilation of the interior of said tank while preventing the escape of insects therefrom.

13. The study station as defined in claim 6 wherein said frame is a generally L-shaped member having said tank mounted on the upper portion of its vertical leg and its horizontal leg forming a supporting base.

14. The study station as defined in claim 13 including means on said base for defining the respective positions of said vials below said openings in the bottom wall of the tank.

15. The study station as defined in claim 14 wherein the last mentioned means comprises a template having a plurality of recesses formed therein, said recesses each having a configuration corresponding to a portion of the periphery of said vials to receive said vials in proper position below their associated openings in the bottom wall of said tank.

16. The study station as defined in claim 15 including a second template mounted on the exterior of the bottom wall of said tank and having a plurality of recesses formed therein being respectively located adjacent the openings in said bottom wall, said recesses being complementary to the recesses in the first mentioned template and receiving the upper end portions of said vials to hold the vials in position adjacent their associated openings.

17. The study station as defined in claim 16 wherein said vials are seated on said base when received in said templates and have a height substantially equal to the distance between said base and the bottom wall of said tank whereby the top edges of said vials engage the exterior bottom wall of said tank to prevent escape of insects from said tank.

18. The study station as defined in claim 17 wherein said holding means comprises a generally U-shaped bail having the free ends of its legs pivotally mounted on said tank, with the bight portion thereof extending generally parallel to said templates, and spring means for biasing said bail toward the recesses in said templates whereby the bight portion of the bail will engage vials in said templates to hold the vials against the templates and in position below their associated openings in the bottom wall of said tank.

* * * * *